United States Patent
Rao et al.

[11] Patent Number: 5,227,907
[45] Date of Patent: Jul. 13, 1993

[54] METHOD AND DEVICE FOR DECENTRALIZED TRANSMISSION OF DATA ON A TRANSMISSION LINE

[75] Inventors: Sathyanarayana Rao, Bern; Martin Potts, Gerzensee; Reto Beeler, Bern, all of Switzerland

[73] Assignee: Ascom Tech AG, Bern, Switzerland

[21] Appl. No.: 499,363

[22] PCT Filed: Oct. 31, 1989

[86] PCT No.: PCT/CH89/00189
 § 371 Date: Jun. 15, 1990
 § 102(e) Date: Jun. 15, 1990

[87] PCT Pub. No.: WO90/05420
 PCT Pub. Date: May 17, 1990

[30] Foreign Application Priority Data
 Nov. 3, 1988 [CH] Switzerland ............ 04093/88-4

[51] Int. Cl.$^5$ ............................................. H04J 14/08
[52] U.S. Cl. ........................................ 359/137; 359/126; 370/94.2; 370/111
[58] Field of Search ............ 359/135-137, 359/139, 126; 370/94.2, 101, 94.1, 111

[56] References Cited

U.S. PATENT DOCUMENTS 4,631,718 12/1986 Miyao ........................... 359/135
4,933,935 6/1990 Adams ........................... 370/94.1

FOREIGN PATENT DOCUMENTS 2207326 1/1989 United Kingdom .

Primary Examiner—Edward L. Coles, Sr.
Assistant Examiner—L. Pascal
Attorney, Agent, or Firm—McAulay Fisher Nissen Goldberg & Kiel

[57] ABSTRACT

Every subscriber node connected to an optical fiber comprises an access unit with a directional coupler which is controlled via an output amplifier, an optoelectric converter being connected subsequent to the directional coupler. Packets run on the fiber. The first bit of the packets indicates whether it is an empty packet (shown by "light" or "bright") or a data packet (shown by "no light" or "dark"). As soon as the node has prepared data for transmission in a buffer storage, a test is effected at each arriving packet as to whether or not it is an empty packet. For this purpose, the light of every first bit is guided to a L/I detector which carries out this test in a "flying" manner, while a no-light bit passes on to the outgoing fiber. If the L/I bit indicates a data packet, the control immediately switches the directional coupler to pass, so that the packet passes the node so as to be unchanged. On the other hand, if the L/I bit indicates an empty packet, the contents of the buffer storage is read into this packet. The node cane accordingly transmit without the slightest time delay occurring in the packet stream.

12 Claims, 6 Drawing Sheets

METHOD AND DEVICE FOR DECENTRALIZED TRANSMISSION OF DATA ON A TRANSMISSION LINE

BACKGROUND OF THE INVENTION a) Field of the Present Invention

The invention is directed to a method and an assigned device for decentralized transmission of data on a transmission line corresponding to the preamble of the independent claims.

b) Background Prior Art

Transmission lines and diverse types of data transmission via such lines are generally known. Recently, optical transmission lines have become increasingly important for various reasons. In addition to the optical point-to-point connections, there are also complicated network structures with optical lines. For example, in an article entitled "Optical fibres in local area networks", Communications/Communications International, October 1985, pages 19 ff., B. Viklund describes various network structures with glass fiber cables for distribution networks and for networks with connections between different subscribers which can be set up individually. In the latter, a ring configuration is most favorable. The subscriber stations of an optical transmission line of the aforementioned type are connected to the respective utilized fibers via optical couplers.

At present, there are couplers, switches and modulators based on GaAs semiconductor material for optical systems which utilize electro-optical effects for influencing light. These elements work up to frequencies in the gigahertz range.

The use of address-coded packets for transmitting data is generally known. Such packets comprise a head part (header) and a data part, wherein the head part contains all necessary data for the respective packet and the participating transmission devices, particularly the respective transmitter and receiver. The data part is available for the data to be transmitted. If it is empty, it is referred to as an empty packet.

Various methods are known for producing address-coded packets and converting empty packets into data packets. In this respect, reference is made e.g. to the patent CH 550 521 which describes one of the first methods presently known as "buffer insertion". What all of these methods have in common is that they have a delay at some point, be it a matter of the insertion of a new packet into an existing stream of packets, wherein the entire stream is delayed by the length of a packet, or be it a matter of having to wait for the reading of the head part of a packet before it is clear whether or not it is an empty packet, etc.

In optical systems, a controlled delay on the transmission lines was (until now) not possible. Such a delay can only be effected in that it is effected in the electronic part of the system, e.g. by means of a shift register. In an optical transmission line chiefly comprising so-called passive subscriber nodes which have no active light source (e.g. a laser diode), there is the problem of providing a method for detecting passing empty packets entirely without delay and filling them with prepared data. These methods must be consistent with the method of receiving data packets which run or arrive via the same transmission line.

The solution to this problem is provided by means of the independent claims, while the dependent claim indicates a construction of the invention. Accordingly, it is now possible to set up relatively simple and accordingly inexpensive subscriber nodes in optical transmission lines.

The invention is explained in more detail in the following by way of example with the aid of seven diagrams.

DESCRIPTION OF THE PREFERRED EMBODIMENTS

Figure 1:
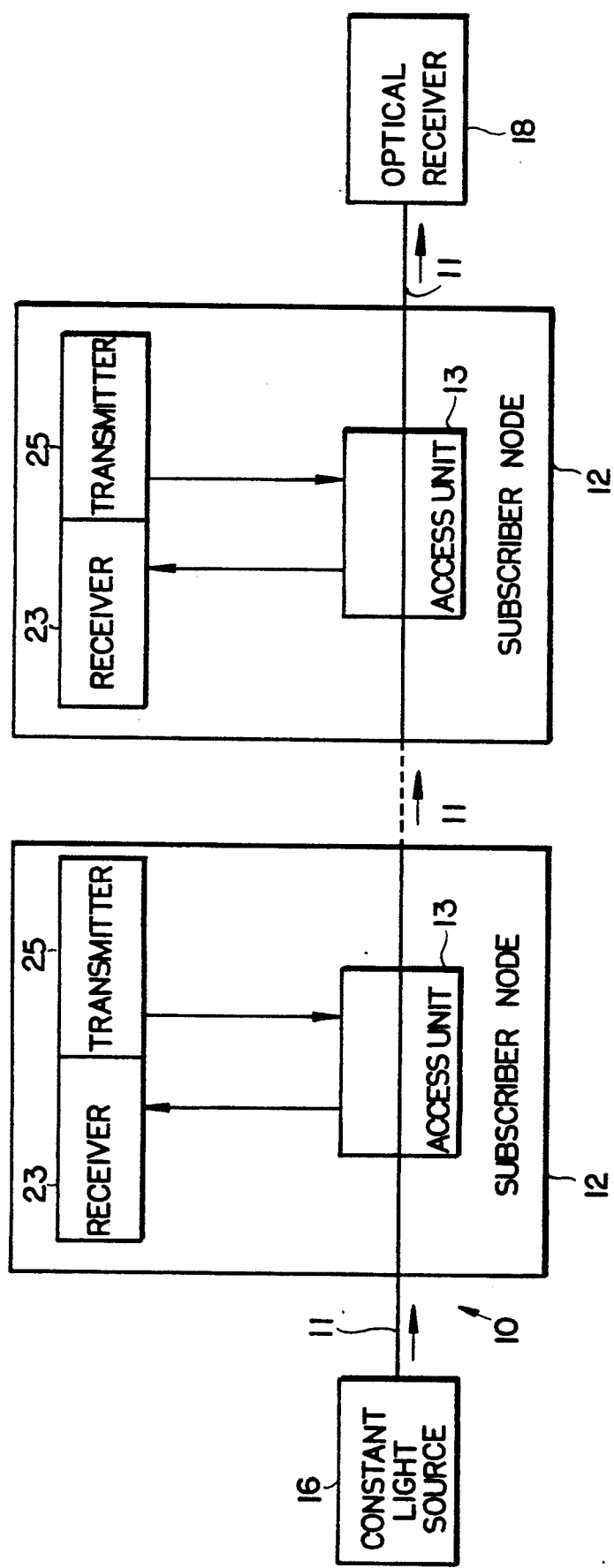
FIG. 1 is a schematic view of an optical transmission line.

FIG. 1 shows a schematic view of a transmission line 10 on which digital signals are transmitted in the direction of the arrow. An optical fiber 11, particularly a single-mode fiber, serves as transmission medium. A plurality of subscriber nodes 12 is included in this fiber 11, so that the fiber 11 is divided into portions, but the light flow, as a whole, is not interrupted.

The light flow commences in a light source 16, particularly a semiconductor laser, which feeds a substantially continuous constant light flow into the commencement of the fiber 11. The light flow ends in an optical receiver 18, particularly a photodiode with an amplifier connected subsequently. The subscriber nodes 12 comprise access units 13 which do not interrupt the light flow along the transmission lines 10 as described. The subscriber nodes 12 are further constructed in such a way that they can receive data contained in the light flow and insert data into the light flow. For this purpose, an electronic receiver 23 which processes the received data and a transmitter 25 which provides the data to be transmitted are connected to the access units 13.

Figure 2:
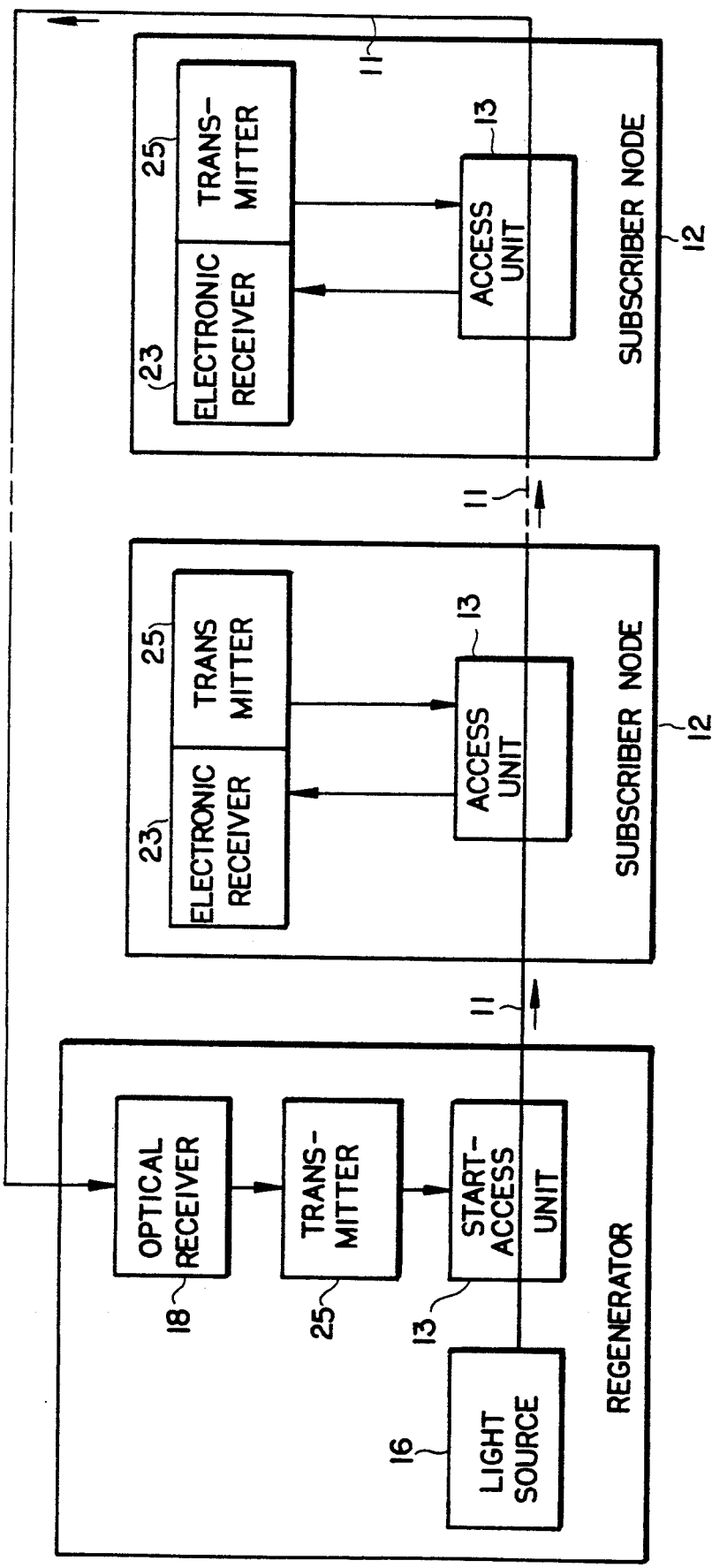
FIGS. 2 and 3 show variants of the transmission line.

FIG. 2 shows a first variant of the transmission line 10. The latter has a ring-shaped configuration, so that the optical receiver 18 can be connected, via a short electrical connection, to a transmitter 25 of a start-access unit 13 connected subsequent to the light source 16. Accordingly, a ring-shaped arrangement is formed in which every subscriber node 12 can communicate with every other subscriber node 12. In so doing, the unit 16 forms the single light source.

Figure 3:
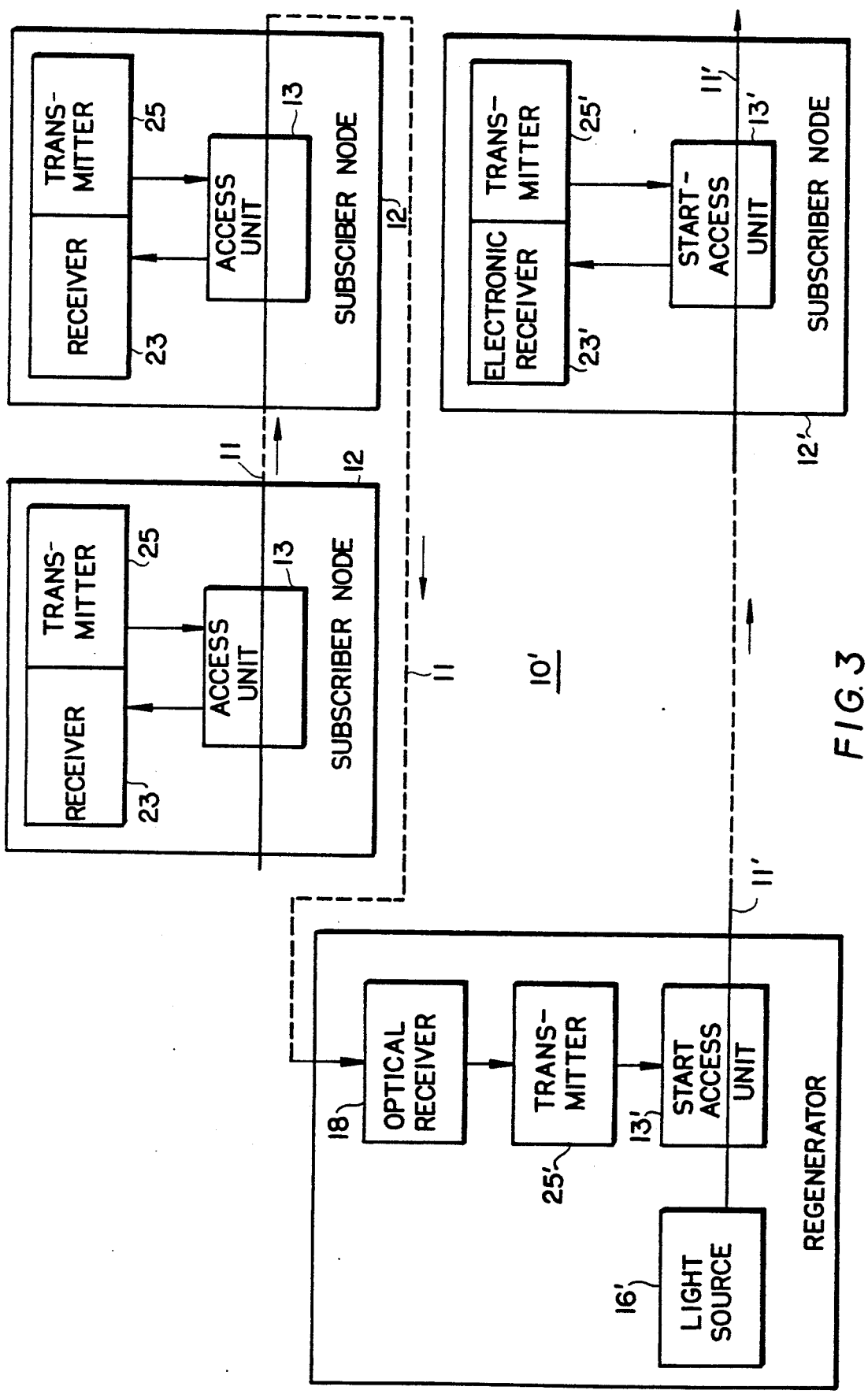

FIG. 3 shows a second variant of the transmission line 10. In the case, the optical receiver 18 is connected to a transmitter 25' of another transmission line 10', likewise by means of a short electrical connection. Similarly, this transmitter 25' is assigned to another start-access unit 13' which is connected subsequent to another light source 16'. In this way, two or more transmission lines 10, 10' are switchable in series: naturally, the transmission lines 10, 10' can in turn be combined in a circular manner in their entirety.

Figure 4:
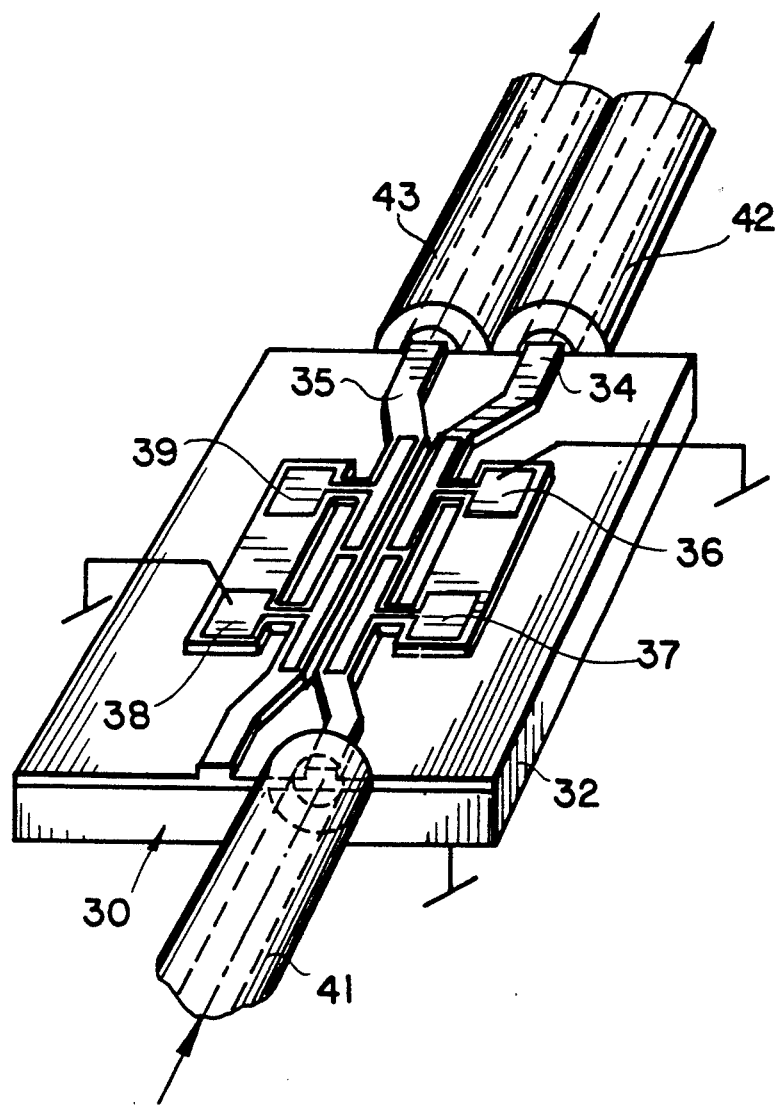
FIG. 4 is a schematic view of an optical directional coupler.

FIG. 4 shows a schematic, greatly enlarged view of an integrated optical directional coupler 30 as the core of the aforementioned access units 13. The directional coupler 30 comprises two adjacent optical ribbed waveguides 34, 35 on an InP substrate 32, which ribbed waveguides 34, 35 are covered by a total of four metallic control electrodes 36 to 39, via which electrical control voltage can be applied. The directional coupler is connected on its input side to an incoming fiber, particularly a single-mode fiber 41, with one ribbed waveguide 34. It is connected on the output side to an outgoing single-mode fiber 42 and 43 by the two ribbed waveguides 34, 35, respectively.

Figure 5:
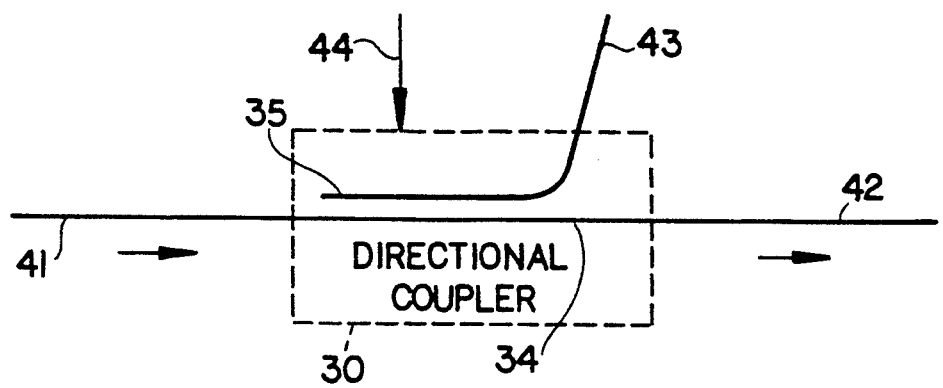
FIG. 5 is a symbolic view of the directional coupler.

The described directional coupler 30, known per se, works as a light switch, wherein the light flow arriving via the fiber 41 can be divided into the two outgoing fibers 32, 43 more or less intensity depending upon the voltages applied to the control electrodes 36 to 39. FIG. 5 shows a symbolic view of the directional coupler 30 which is supposed to express the switching function. The arrow 44 symbolizes the electrical control possibility which is provided via the control electrodes 36 to 39 (FIG. 4).

Figure 6:
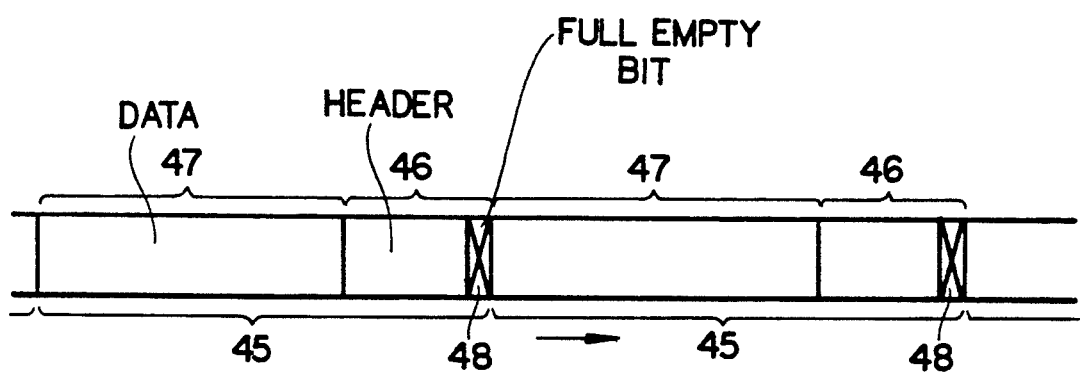
FIG. 6 shows a schematic construction of a packet.

FIG. 6 a schematic view of a sequence of digital packets 45 running on the transmission line 10 with respect to time in the direction of the arrow. These packets are formed by means of intensity modulation of the constant light flow generated by the light source 16 and comprise a head part 46 and a data part 47 in each instance. If the data part 47 is empty, then it is an empty packet, otherwise it is a data packet. The packets 45 follow one another contiguously and in whatever succession and comprise a considerable quantity of bits, e.g. 1000 bits. The packets 45 are formed in such a way that every access unit 13 can be synchronized independently to the bit timing BT and the packet timing PT of the packets 45. The first bit of each packet 45 distinguishes the empty packets from the data packets and is designated L/I bit 48 in the following (L=empty, I=-data).

The packets 45 successively pass through all subscriber nodes 12 on the transmission line 10. In so doing, the light intensity of the packets (which carries the data) diminishes because of losses in the optical fibers 11 on the one hand and because of branching losses in the access units 13 on the other hand. These branch losses are unavoidable because every receiver 23 continuously monitors all of the packets 45 passing through the respective access unit 13 to determine whether its address is contained in the head part and consequently whether it (the receiver 23) is accordingly the receiver of the respective data part 47 determined by the address.

If data is to be transmitted to the transmission line 10 by a transmitter 25, this data is prepared in packets and written into empty packets as they pass through the respective subscriber nodes 12. For this purpose, on the one hand, the L/I bit 48 of every packet 45 must be read in the respective subscriber node 12 or the respective receiver 23. On the other hand, this L/I bit must be simultaneously changed from its one state L (empty) to its second state I (data) insofar as an empty packet is concerned. Successive subscriber nodes 12 in the signal stream can then accordingly determine that there is no longer an empty packet in the sequence, but rather a data packet.

Figure 7:
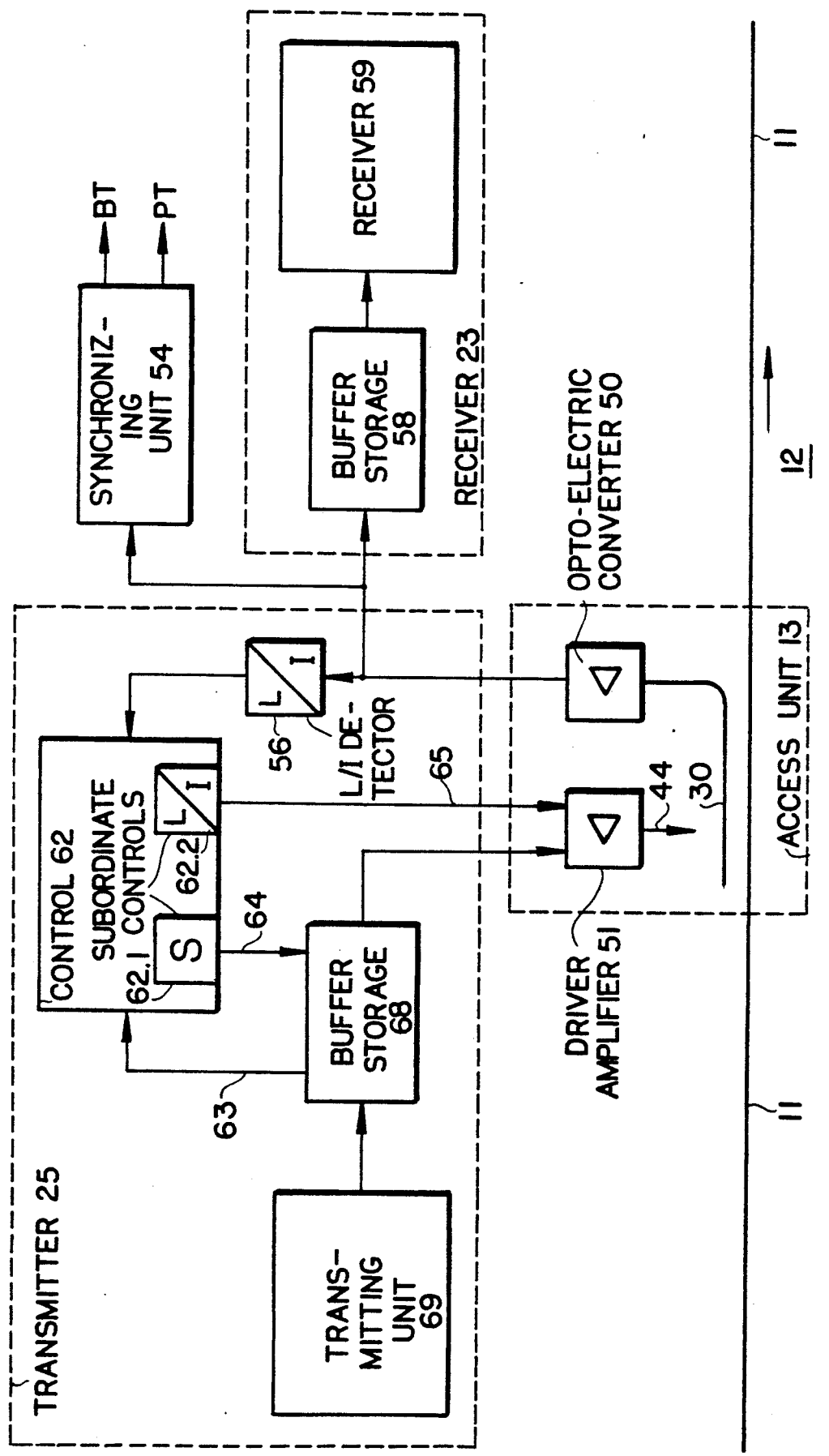
FIG. 7 is a block wiring diagram of a subscriber node.

The process of the simultaneous reading and changing of the respective L/I bit 48 is effected in the following manner: every subscriber node 12 and accordingly also the respective receiver 23 is synchronized to the bit timing BT and the packet timing PT. As soon as data has been prepared to be written into an empty packet, the respective access unit 13 extracts completely the light of every subsequent L/I bit 48 to the L/I detector 56 with the aid of its directional coupler 30 (FIG. 7). If the quantity of this light is smaller than a predetermined threshold amount, or if it is zero, this signifies the "data" state I. In this case, it is a data packet which may not be changed. The directional coupler 30 is therefore reset its normal position immediately, i.e. already for the second bit of the respective packet 45. The data packet which continues to run accordinqly comprises a L/I bit 48 which is formed from "zero light" so as to be practically unchanged, while the rest of the packet comprises the original bits, i.e. dark and light patterns, so as to be completely unchanged.

On the other hand, if the light quantity of the L/I bit 48 is greater than the aforementioned threshold amount, this signifies the L state, i.e. empty. In this case, it is an empty packet which is to be filled immediately with the prepared data by means of modulation in bit timing BT. The L/I bit 48 was already changed from "bright" to "dark" by means of the aforementioned position of the directional coupler 30, so that the packet 45 which continues to run to the next access unit 13 is a complete data packet which has not undergone any delay in the aforementioned subscriber node 12 or by means of the conversion process.

The preconditions for the described method are that the L/I bit 48 be foremost at the tip of the packets 45 and that its first state L (empty packet) be shown as bright or as present light intensity, while its second state is not present light intensity.

FIG. 7 shows a refined block wiring diagram of a subscriber node 12 with the described access unit 13 and the respective receiver 23 and transmitter 25. This subscriber node 12 constitutes a technical development by means of which the described method of simultaneous reading and conversion of the L/I bit 48 can be carried out. As already described, an access unit 13 which comprises a directional coupler 30 is included in the optical fiber 11. An optoelectric converter 50 with integrated input amplifier is connected to the output of the access unit 13. An output or driver amplifier 51 is connected with the control electrodes 36 to 39 of the directional coupler 30 which (as explained with the aid of FIG. 5) are symbolized by the arrow 44.

The aforementioned receiver 23, a synchronizing unit 54 and a L/I detector 56 are connected to the output of the input amplifier 50. The receiver 23 comprises a buffer storage 58 for receiving all bits of received packets 45 and an actual receiver unit 59 for the reception of the data determined for the respective node 12. The synchronizing unit 54 is a unit, known per se, which regenerates the bit timing BT and the packet timing PT from the signal pattern on the fiber 11 synchronously and in correct phase. These timings BT and PT applied to their outputs serve for the control of the entire respective subscriber node 12. Finally, the L/I detector 56 is by its function already point of the sender 25. The L/I detector 56 indicates whether or not the L/I bit 48 comprises the significance L (empty packet) or I (data packet). The L/I detector 56 can be constructed e.g. as monostable multivibrator with a fixed threshold voltage.

The transmitter 25 is connected prior to the output amplifier 51. The transmitter 25 comprises a buffer storage 68 in which the data to be transmitted is prepared in packets. In addition, it comprises an actual transmitting unit 69 and a control 62 with two subordinate controls 62.1 and 62.2. The control 62 is connected to the buffer storage 68, the L/I detector 56 and the output amplifier 51 in accordance with the signals.

The subscriber node 12 operates as follows: as soon as data is prepared for a packet 45 in the buffer storage 68, the control 62 is correspondingly informed via the connection 63. The subordinate control 62.2 then extracts the light from every L/I bit 48 (and only the latter) arriving subsequently at the access unit 13 by means of a corresponding direction control of the directional coupler 30 via the optoelectric converter 50 to the L/I detector 56. This L/I detector 56 immediately decides whether or not the L/I bit 48 indicates the L state (empty packet) or I state (data packet). In the L state, the subordinate control 62.1 immediately sends a transmit command to the buffer storage 68 via the connection 64, whereupon the buffer storage 68 via the output amplifier 51 transmits the data contained with it to the respective empty packet in bit timing BT. This means that the light flow of the empty packet becomes modulated and the packet is transformed into a data packet. On the other hand, if the L/I bit 48 indicates a data packet I, nothing more happens, since the subordinate control 62.2 switches the directional coupler 31 back into its pass direction and accordingly into the basic state, generally after every L/I bit 38. The respective data packet can therefore pass unchanged. In this way, the next empty packet after the indicated ready-to-transmit state is filled with data, while the data packets pass in an unimpeded manner.

The described optical transmission line 10, 10' with its subscriber nodes 12 is suitable for transmission frequencies up to the gigahertz range. Preferably, ring networks can be constructed, in which every subscriber node 12 can communicate with every other node as desired. The length between two respective light sources can amount to many kilometers. It depends solely on the losses in the optical fibers 11 and on the quantity of the respective connected subscriber nodes 12, since there (as described) cause a certain light loss too.

While the foregoing description and drawings represent the preferred embodiments of the present invention, it will be obvious to those skilled in the art that various changes and modifications may be made therein without departing from the true spirit and scope of the present invention.

What is claimed is:

1. In a method for decentralized transmission of data on an optical transmission line from a plurality of subscriber nodes, wherein the data is prepared in packets in the subscriber nodes, the packets having a beginning and an ending bit, wherein data packets and empty packets immediately follow one another on the transmission line in random order and the data is carried by means of a modulated light flow, wherein every subscriber node is synchronized to the bit timing of the transmission line, and wherein data packets and empty packets are distinguished by the significance of a L/I bit in such a way that the L/I bit's first state (L) signifies an empty packet and the L/I bit's second state (I) signifies a data packet, the improvement comprising: arranging the L/I bit as the beginning bit of the packets, and simultaneously:
    (a) determining the initial state (L,I) of the L/I bit of every successively arriving packet,
    (b) bringing the L/I bit into the second state (I) in every subscriber node which has prepared data for transmission,
    (c) writing the prepared data in the packet which originally had an L/I bit designating the first state to form a new packet, and
    (d) transmitting the new packet to the next subscriber node.

2. A method according to claim 1, including the steps of using light originating from a constant light source on the transmission line, and writing data into a packet by means of the intensity modulation of the light.

3. A method according to claim 2, wherein the intensity modulation of the light is effected by means of the branching off of a portion of the respective intensity of a main path of the light to a secondary path.

4. A method according to claim 1, wherein the first state (L) of the L/I bit is constituted by absence of light intensity and the second state (I) by the light intensity.

5. In a device for implementing a method for decentralized transmission of data on an optical transmission line from a plurality of subscriber nodes, wherein the data is prepared in packets from a plurality of subscriber nodes, wherein data packets and empty packets successively follow one another on the transmission line in desired sequence and the data are carried by means of a modulated light flow, wherein every subscriber node is synchronized to the bit timing and the packet timing of the transmission line, and wherein data packets and empty packets are distinguished by the significance of a L/I bit in such a way that its first state (L) signifies an empty packet and its second state (I) signifies a data packet, wherein every subscriber node comprises a directional coupler which is connected to an optical fiber and to which an optoelectric converter is assigned, an input amplifier and an output amplifier for driving the control electrodes of the directional coupler, a synchronizing unit for synchronizing the respective subscriber node to the bit timing and packet timing at the directional coupler, and a buffer storage in which the data to be transmitted can be prepared, the improvement comprising: every subscriber node including a first control, which extracts the total light intensity form the L/I bit transmitted by the optical fiber and routes it to the optoelectric converter via the output amplifier and the directional coupler; a L/I detector for determining the respective initial state (L,I) of the L/I bits and for transmitting a signal which corresponds to the state of the L/I bit, the L/I detector being connected subsequent to the optoelectric converter; and a second control which triggers the transmission of the data prepared in the buffer storage in the packet which originally had an L/I bit which designates the empty state.

6. A device according to claim 5, wherein the L/I detector is a monostable multivibrator with fixed threshold voltage.

7. In a method for decentralized transmission of data on an optical transmission line from a plurality of subscriber nodes, wherein the data is prepared in packets in the subscriber nodes, the packets having a beginning and an ending bit, wherein data packets and empty packets immediately follow one another on the transmission line in random order and the data is carried by means of a modulated light flow, wherein every subscriber node is synchronized to the bit timing of the transmission line, and wherein data packets and empty packets are distinguished by the significance of a L/I bit in such a way that the L/I bit's second state (L) signifies an empty packet and the L/I bit's second state (I) signifies a data packet, the improvement comprising: using light originating from a constant light source on the transmission line, arranging the L/I bit as the beginning bit of the packets, and simultaneously:

(a) determining the initial state (L,I) of the L/I bit of every successively arriving packet;

(b) brining the L/I bit into the second state (I) in every subscriber node which has prepared data for transmission, (c) writing the prepared data by means of intensity modulation of the light into the packet which originally had an L/I bit designating the first state (L), and (d) transmitting the packet to the next subscriber node.

8. A method according to claim 7, wherein the intensity modulation of the light is effected by means of the branching off of a portion of the respective intensity of a main path of the light to a secondary path.

9. A telecommunications network for the transmission of information packets which comprise bits of information, said telecommunications network comprising:

a single optical fiber;

a single light source for delivering a constant light beam at one end of said fiber, said light beam having a fixed bit rate and a fixed packet rate; and, a plurality of subscriber nodes connected to said fiber, each of said nodes comprising a modulator for intensity modulation of said light beam for forming said information packets, said information packets having a full/empty bit which designates whether an individual packet is full or empty, said full/empty bit being a first bit of said information packets, and wherein said subscriber nodes are synchronized with said bit rate and said packet rate to accept and transmit information without delay, said fiber transporting digital data between said subscriber nodes, wherein said nodes transmit data by searching and waiting for an empty packet to arrive, having found said empty packet, filling said packet to form a full packet, said full packet being transmitted and said nodes having means for effecting a reading process which changes said full/empty bit to designate its corresponding data packet as said full packet.

10. The telecommunications network according to claim 9, wherein said modulator is a directional coupler, and said intensity modulation is effected by branching off a portion of the respective intensity of said light beam of said fiber to a secondary light path.

11. The telecommunications network according to claim 10, wherein said subscriber nodes further comprise:

an optoelectronic converter connected to said secondary light path;

a buffer storage for information to be transmitted;

a first and a second control unit to control said directional coupler via an output amplifier; and, a full/empty-detector connected to said optoelectronic converter and to said control units, wherein said second control unit causes said light intensity travelling within said fiber at said full/empty bit to branch off to said secondary path causing said full/empty bit to indicate that said packet is full, and if said full/empty-bit originally indicated that said packets was empty, said first empty packet to contain said information of said buffer storage.

12. The telecommunications network according to claim 11, wherein said full/empty-detector is a monostable multivibrator with fixed threshold voltage.

* * * * *